US011923673B2

(12) United States Patent
Eguchi et al.

(10) Patent No.: US 11,923,673 B2
(45) Date of Patent: Mar. 5, 2024

(54) SEMICONDUCTOR DEVICE

(71) Applicant: Mitsubishi Electric Corporation, Tokyo (JP)

(72) Inventors: Keisuke Eguchi, Tokyo (JP); Takamasa Miyazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 17/657,002

(22) Filed: Mar. 29, 2022

(65) Prior Publication Data

US 2023/0100056 A1    Mar. 30, 2023

(30) Foreign Application Priority Data

Sep. 24, 2021   (JP) .................................. 2021-155138

(51) Int. Cl.
*H02H 3/00* (2006.01)
*H02H 1/00* (2006.01)
*H02H 3/08* (2006.01)

(52) U.S. Cl.
CPC ............ *H02H 3/08* (2013.01); *H02H 1/0007* (2013.01)

(58) Field of Classification Search
CPC ............................... H02H 3/08; H02H 1/0007
USPC ........................................................ 361/86
See application file for complete search history.

(56) References Cited

U.S. PATENT DOCUMENTS

| 5,081,379 | A | * | 1/1992 | Korteling | ......... | G01R 19/16519 |
|---|---|---|---|---|---|---|
| | | | | | | 327/51 |
| 5,621,601 | A | * | 4/1997 | Fujihira | ............. | H03K 17/0828 |
| | | | | | | 361/115 |
| 9,720,029 | B2 | * | 8/2017 | Sekigawa | .......... | G01R 31/2608 |
| 2014/0035611 | A1 | * | 2/2014 | Sato | .................... | G01R 31/2608 |
| | | | | | | 324/762.08 |
| 2016/0126718 | A1 | | 5/2016 | Naito et al. | | |
| 2017/0373583 | A1 | * | 12/2017 | Nakajima | .......... | H03K 17/0828 |
| 2019/0140630 | A1 | * | 5/2019 | Chen | ..................... | H03K 17/163 |
| 2020/0028505 | A1 | * | 1/2020 | Sasaki | ................. | H01L 29/7393 |
| 2020/0287538 | A1 | * | 9/2020 | Kohama | .............. | H03K 17/731 |
| 2022/0131455 | A1 | * | 4/2022 | Sugie | .................. | H02M 1/0029 |

FOREIGN PATENT DOCUMENTS

JP         2016-092907 A      5/2016

* cited by examiner

*Primary Examiner* — Jared Fureman
*Assistant Examiner* — Lucy M Thomas
(74) *Attorney, Agent, or Firm* — Studebaker & Brackett PC

(57) ABSTRACT

A semiconductor device includes: a switching device including a main portion and a current sensing portion for detecting a current value of the main portion; a control IC including a gate drive unit that drives the switching device; a sensing resistor connected between an emitter of the main portion and an emitter of the current sensing portion and formed inside the control IC; a comparator comparing a sense voltage applied to the sensing resistor with a reference voltage; and a shut-down circuit shutting down an energization of the switching device when the sense voltage exceeds the reference voltage, wherein the sense voltage is more than or equal to 1 V when the energization of the switching device is shut down.

8 Claims, 4 Drawing Sheets

SEMICONDUCTOR DEVICE

BACKGROUND OF THE INVENTION

Field

The present disclosure relates to a semiconductor device

Background

To achieve miniaturization of a semiconductor device, a semiconductor device having a configuration in which an overcurrent detection circuit of a switching device is incorporated in a control IC is proposed (for example, see JP 2016-92907 A).

SUMMARY

The overcurrent detection circuit includes a sensing resistor that converts a current flowing to a current sensing portion of the switching device into a voltage. As the variation in the manufacturing of the sensing resistor incorporated in the control IC increases, the variation in an overcurrent detection value also increases. This results in a problem that overcurrent detection accuracy of the switching device is deteriorated.

The present disclosure has been made in view of the above-described issue, and an object of the present disclosure is to obtain a semiconductor device capable of improving the overcurrent detection accuracy of a switching device.

A semiconductor device according to the present disclosure includes: a switching device including a main portion and a current sensing portion for detecting a current value of the main portion; a control IC including a gate drive unit that drives the switching device; a sensing resistor connected between an emitter of the main portion and an emitter of the current sensing portion and formed inside the control IC; a comparator comparing a sense voltage applied to the sensing resistor with a reference voltage; and a shut-down circuit shutting down an energization of the switching device when the sense voltage exceeds the reference voltage, wherein the sense voltage is more than or equal to 1 V when the energization of the switching device is shut down.

In the present disclosure, the sense voltage when the energization of the switching device is shut down is more than or equal to 1 V. Thus, the variation of the sense voltage depending on the variation in the manufacturing of the sensing resistor can be suppressed. Consequently, the overcurrent detection accuracy of the switching device can be improved.

Other and further objects, features and advantages of the invention will appear more fully from the following description.

DESCRIPTION OF EMBODIMENTS

A semiconductor device according to the embodiments of the present disclosure will be described with reference to the drawings. The same components will be denoted by the same symbols, and the repeated description thereof may be omitted.

First Embodiment

Figure 1:
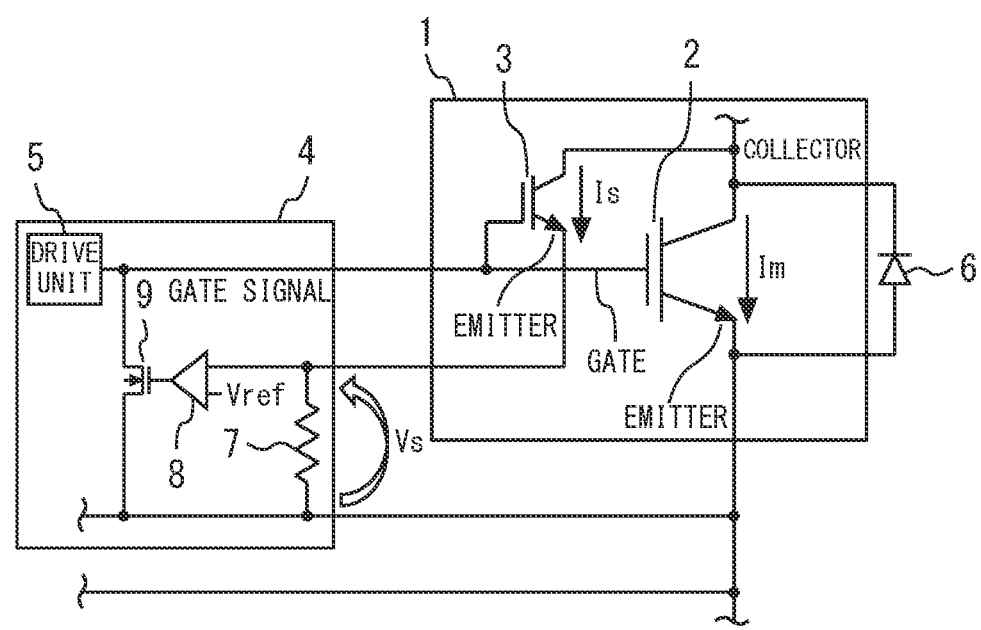
FIG. 1 is a circuit diagram illustrating a semiconductor device according to a first embodiment.

FIG. 1 is a circuit diagram illustrating a semiconductor device according to a first embodiment. A switching device 1 is an IGBT and includes a main portion 2 and a current sensing portion 3 for detecting a current value of the main portion 2. The current sensing portion 3 is formed inside the switching device 1. A control IC 4 includes a gate drive unit 5 that drives the switching device 1. A free-wheeling diode 6 is connected in parallel with the switching device 1.

The current sensing portion 3 has an extremely small effective area that is less than or equal to 1/3000 of the effective area of the main portion 2. The effective area is an area of a cell through which a current flows. Accordingly, if a main current Im flows to the main portion 2, a sense current Is depending on an effective area ratio flows also to the current sensing portion 3.

A sensing resistor 7 is connected between the emitter of the main portion 2 and the emitter of the current sensing portion 3, and is formed inside the control IC 4. The sensing resistor 7 converts the sense current Is flowing to the current sensing portion 3 into a sense voltage Vs. A comparator 8 compares the sense voltage Vs applied to the sensing resistor 7 with a predetermined reference voltage Vref. If the sense voltage Vs is more than or equal to the reference voltage Vref, the comparator 8 outputs a shut-down signal. A shut-down circuit 9 is a MOSFET. Upon the shut-down circuit 9 is received the shut-down signal from the comparator 8, the shut-down circuit 9 connects the gate of the switching device 1 to GND, to thereby forcibly shut down the energization of the switching device 1.

Figure 2:
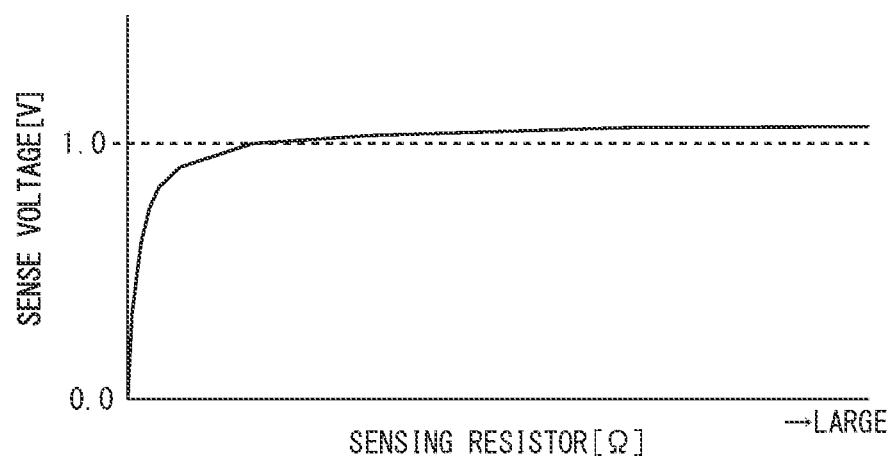
FIG. 2 is a graph illustrating a relationship between a resistance value of the sensing resistor and a sense voltage.
Figure 3:
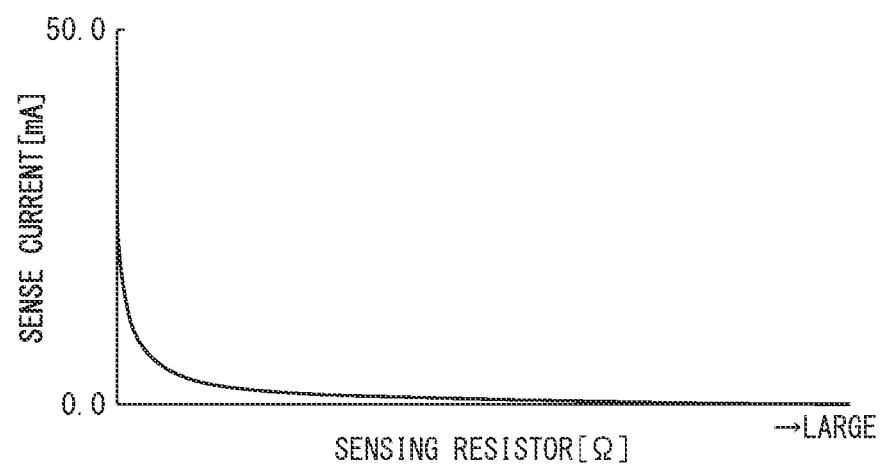
FIG. 3 is a graph illustrating a relationship between a resistance value of the sensing resistor and a sense current.

FIG. 2 is a graph illustrating a relationship between a resistance value of the sensing resistor and a sense voltage. FIG. 3 is a graph illustrating a relationship between a resistance value of the sensing resistor and a sense current. A gate voltage is fixed to 15 V and a collector current is fixed to 450 A, while the resistance value of the sensing resistor 7 is varied. The collector current of 450 A is three times as much as a rated current and corresponds to a current that flows in an overcurrent state where the energization of the switching device 1 is to be shut down. The voltage Vs increases as the resistance value of the sensing resistor 7 is increased, but the sense current Is flowing to the current sensing portion 3 gradually decreases.

As illustrated in FIG. 2, if the sense voltage Vs is more than or equal to 1 V, the variation of the sense voltage Vs with respect to the variation in the resistance value of the sensing resistor 7 decreases. A critical value "1 V" is determined depending on a current density (rated current value per unit area) of the current sensing portion 3. However, the critical value does not greatly change depending on designed values of the semiconductor device. For example, the critical value is not a value that varies when a chip area is decreased by about 10%.

In this case, a semiconductor device for a product with a higher withstand voltage has a higher thickness, and thus the semiconductor device is designed with a low current density. The current density of the current sensing portion 3 is 240 to 420 A/cm$^2$ when a device for 600 V withstand voltage (AC 200 V system) is used. The current density of the current sensing portion 3 is 120 to 240 A/cm$^2$ when a device for 1200 V withstand voltage (AC 400 V system) is used. The resistance value of the sensing resistor 7 when the sense voltage Vs in the overcurrent state is more than or equal to 1 V is more than or equal to 130Ω in the device for 600 V withstand voltage, and is more than or equal to 180Ω in the device for 1200 V withstand voltage.

If the sensing resistor 7 is incorporated in the control IC 4, the variation in the manufacturing of the resistance value of the sensing resistor 7 increases. Accordingly, in the present embodiment, the sensing resistor 7 is set such that the sense voltage Vs when the energization of the switching device 1 is shut down is more than or equal to 1 V. Thus, the variation of the sense voltage Vs depending on the variation in the manufacturing of the sensing resistor 7 can be suppressed. Consequently, the overcurrent detection accuracy of the switching device 1 can be improved.

If the energization current value of the switching device 1 increases, the switching device 1 can be broken. To prevent breaking of the switching device 1, if the sense voltage Vs exceeds the reference voltage Vref, the energization of the switching device 1 is shut down. As described above, when the sense voltage Vs when shut-down is more than or equal to 1 V, the variation of the sense voltage Vs with respect to the variation in the resistance value of the sensing resistor 7 decreases. Therefore, the reference voltage Vref is set to any voltage value more than or equal to 1 V.

Further, since the sensing resistor 7 is provided, the emitter voltage of the current sensing portion 3 is higher than the emitter voltage of the main portion 2. With this configuration, a gate voltage of the current sensing portion 3 decreases, which leads to deterioration in the energization capability of the current sensing portion 3. Accordingly, a gate threshold voltage of the current sensing portion 3 is set to be lower than a gate threshold voltage of the main portion 2. Thus, the energization capability of the current sensing portion 3 is improved, so that an amount of a decrease in the energization capability due to the sensing resistor 7 can be compensated.

In general, if the gate threshold voltage of a power semiconductor device is decreased by 0.1 V, the energization capability of the apparatus is increased by about 30% of the rated current. For this reason, the gate threshold voltage of the current sensing portion 3 is set to be higher by 0.1 V than the gate threshold voltage of the main portion 2. Thus, the energization capability is increased by 30%, thereby enabling the devices to operate safely.

The switching device 1 may be an RC-IGBT having a configuration in which an IGBT and a free-wheeling diode are integrated into one chip, or may be a MOSFET or the like. The sensing resistor 7 may be made of polysilicon.

Second Embodiment

Figure 4:
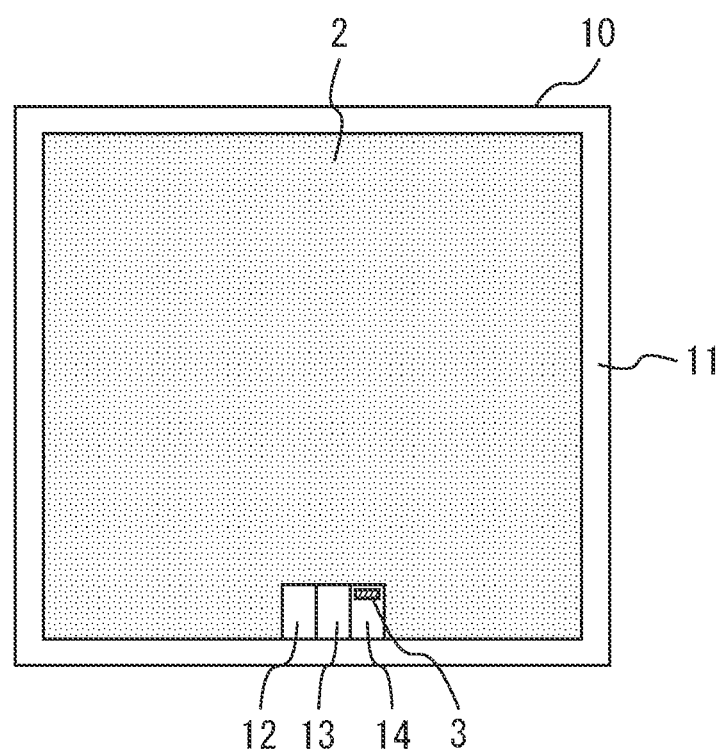
FIG. 4 is a top view illustrating a switching device according to a second embodiment.

FIG. 4 is a top view illustrating a switching device according to a second embodiment. A semiconductor substrate 10 of the switching device 1 is provided with a main portion 2 and the current sensing portion 3, and a terminal region 11 is provided at the outer periphery of the main portion 2 and the current sensing portion 3. A gate pad 12 is connected to the gate of the main portion 2. A gate pad 13 is connected to the gate of the current sensing portion 3. A current sensing pad 14 is connected to the emitter of the current sensing portion 3. The gate pad 12 of the main portion 2 is separated from the gate pad 13 of the current sensing portion 3. With this configuration, the gate of the main portion 2 and the gate of the current sensing portion 3 of the switching device 1 can be driven separately.

Figure 5:
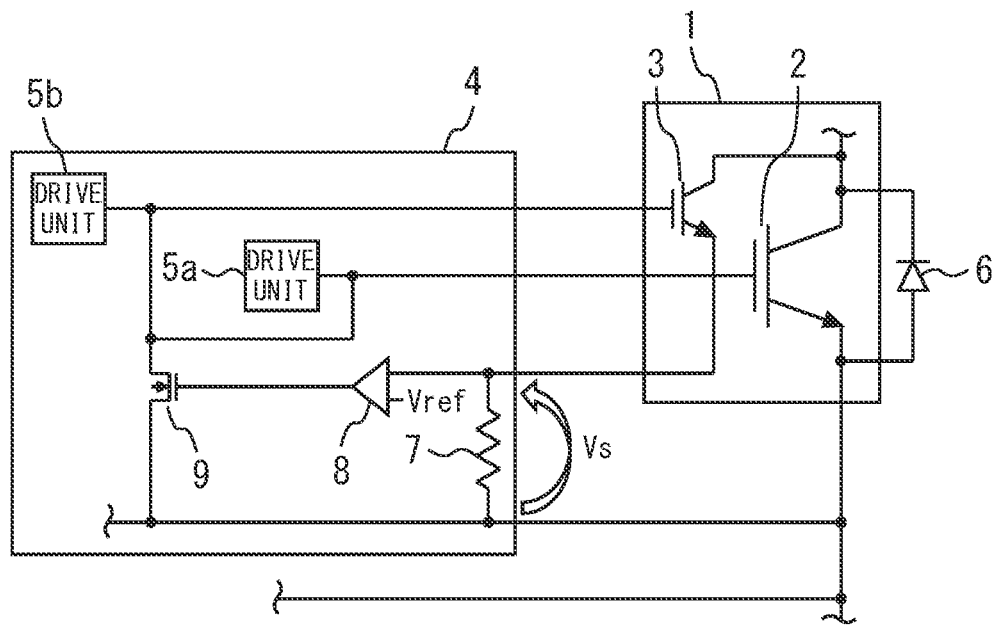
FIG. 5 is a circuit diagram illustrating a semiconductor device according to the second embodiment.

FIG. 5 is a circuit diagram illustrating a semiconductor device according to the second embodiment. The gate of the main portion 2 and the gate of the current sensing portion 3 are separated. A first gate drive unit 5a drives the main portion 2, and a second gate drive unit 5b drives the current sensing portion 3. With this configuration, gate voltages can be applied to the main portion 2 and the current sensing portion 3, respectively. Accordingly, the first gate drive unit 5a and the second gate drive unit 5b are controlled at the same timing and an output voltage of the second gate drive unit 5b is set to be higher than an output voltage of the first gate drive unit 5a. Consequently, the energization capability of the current sensing portion 3 is improved, so that an amount of a decrease in the energization capability of the sensing resistor 7 can be compensated. The other components and advantageous effects are similar to those of the first embodiment.

Third Embodiment

Figure 6:
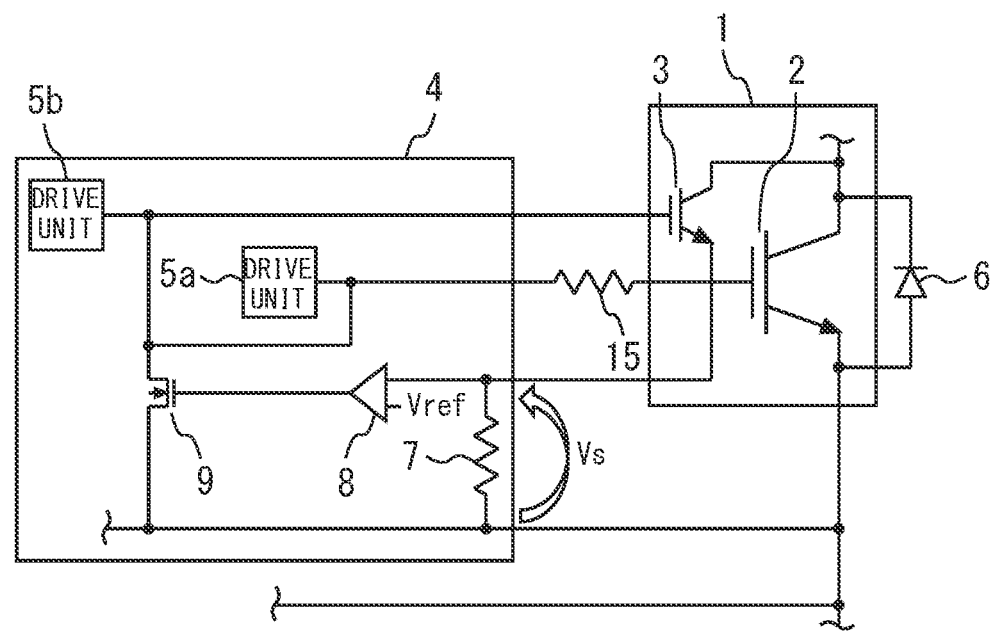
FIG. 6 is a circuit diagram illustrating a semiconductor device according to a third embodiment.

FIG. 6 is a circuit diagram illustrating a semiconductor device according to a third embodiment. A rise or fall of voltage and current occurs due to a switching operation of the main portion 2. This switching operation of the main portion 2 causes noise in the semiconductor device. Accordingly, in the third embodiment, a gate resistor 15 is provided between the control IC 4 and the gate of the main portion 2. The gate resistor 15 decreases a gate voltage of the main portion 2 to reduce the switching speed of the main portion 2, thereby making it possible to reduce noise in the semiconductor device.

If the gate of the current sensing portion 3 is provided with a gate resistor, the gate voltage of the current sensing portion 3 as well as the sense voltage is likely to be decreased by the amount corresponding to the decrease in the voltage of the gate resistor. Therefore, the current sensing portion 3 is not provided with a gate resistor. This configuration makes it possible to adjust the switching speed of the main portion 2, while maintaining the energization capability of the current sensing portion 3. Consequently, the protected operation can be performed safely. The other configurations and advantageous effects are similar to those of the first embodiment or the second embodiment.

Figure 7:
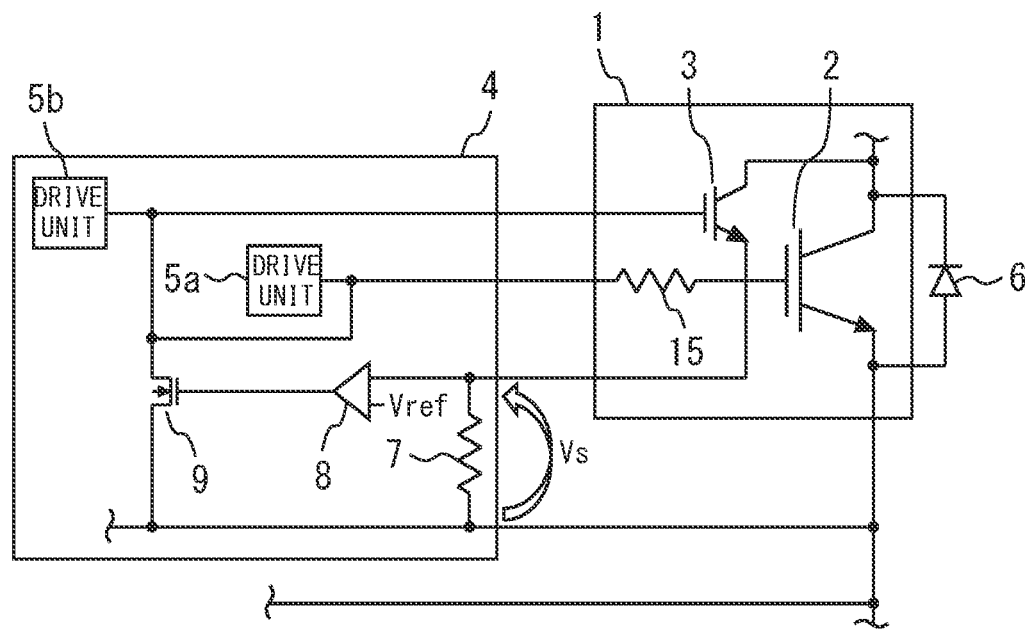
FIG. 7 is a circuit diagram illustrating a modified example of the semiconductor device according to the third embodiment.

FIG. 7 is a circuit diagram illustrating a modified example of the semiconductor device according to the third embodiment. The gate resistor 15 is incorporated in the switching device 1. This configuration enables miniaturization of the semiconductor device.

Fourth Embodiment

Figure 8:
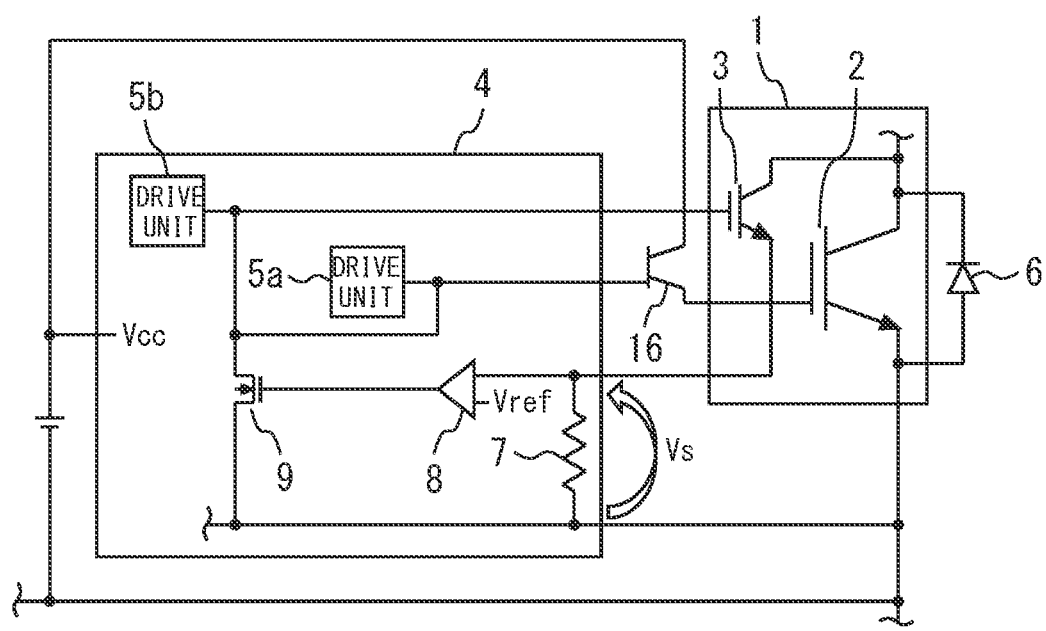
FIG. 8 is a circuit diagram illustrating a semiconductor device according to a fourth embodiment.

FIG. 8 is a circuit diagram illustrating a semiconductor device according to a fourth embodiment. An amplifier 16 that is a bipolar transistor is provided between the control IC 4 and the gate of the main portion 2. The amplifier 16 amplifies a gate current of the main portion 2, so that the switching speed of the main portion 2 can be speeded up. Consequently, a loss in the semiconductor device can be reduced. The other components and advantageous effects are similar to those of the first embodiment.

The switching device 1 and the free-wheeling diode 6 are not limited to devices formed of silicon, but instead may be formed of a wide-bandgap semiconductor having a bandgap wider than that of silicon. The wide-bandgap semiconductor is, for example, a silicon carbide, a gallium-nitride-based material, or diamond. A semiconductor chip formed of such a wide-bandgap semiconductor has a high voltage resistance and a high allowable current density, and thus can be miniaturized. The use of such a miniaturized semiconductor chip enables the miniaturization and high integration of the semiconductor device in which the semiconductor chip is incorporated. Further, since the semiconductor chip has a high heat resistance, a radiation fin of a heatsink can be miniaturized and a water-cooled part can be air-cooled, which leads to further miniaturization of the semiconductor device. Further, since the semiconductor chip has a low power loss and a high efficiency, a highly efficient semiconductor device can be achieved. Both the switching device 1 and the free-wheeling diode 6 are desirably formed of a wide-bandgap semiconductor. However, only one of the switching device 1 and the free-wheeling diode 6 may be formed of a wide-bandgap semiconductor. Also in this case, the advantageous effects described in this embodiment can be obtained.

Obviously many modifications and variations of the present disclosure are possible in the light of the above teachings. It is therefore to be understood that within the scope of the appended claims the invention may be practiced otherwise than as specifically described.

The entire disclosure of Japanese Patent Application No. 2021-155138, filed on Sep. 24, 2021 including specification, claims, drawings and summary, on which the convention priority of the present application is based, is incorporated herein by reference in its entirety.

The invention claimed is:

1. A semiconductor device comprising:
   a switching device including a main portion and a current sensing portion for detecting a current value of the main portion;
   a control IC including a gate drive unit that drives the switching device;
   a sensing resistor connected between an emitter of the main portion and an emitter of the current sensing portion and formed inside the control IC;
   a comparator comparing a sense voltage applied to the sensing resistor with a reference voltage; and
   a shut-down circuit shutting down an energization of the switching device when the sense voltage exceeds the reference voltage, wherein
   the sense voltage is more than or equal to 1 V when the energization of the switching device is shut down,
   the gate drive unit includes a first gate drive unit driving the main portion, and a second gate drive unit driving the current sensing portion, and
   an output voltage of the second gate drive unit is higher than an output voltage of the first gate drive unit.

2. The semiconductor device according to claim 1, wherein a current density of the current sensing portion is 120 to 420 A/cm$^2$.

3. The semiconductor device according to claim 1, further comprising a gate resistor decreasing a gate voltage of the main portion.

4. The semiconductor device according to claim 3, wherein the gate resistor is incorporated in the switching device.

5. The semiconductor device according to claim 3, wherein the current sensing portion includes no gate resistor.

6. The semiconductor device according to claim 1, further comprising an amplifier amplifying a gate current of the main portion.

7. The semiconductor device according to claim 1, wherein a gate pad of the main portion is separated from a gate pad of the current sensing portion.

8. The semiconductor device according to claim 1, wherein the switching device is formed of a wide-band-gap semiconductor.

* * * * *